(12) United States Patent
Kim (10) Patent No.: US 8,281,814 B2
(45) Date of Patent: Oct. 9, 2012

(54) WATER SUPPLY VALVE CARTRIDGE

(76) Inventor: Jong Koo Kim, Incheon (KR)

( * ) Notice: Subject to any disclaimer, the term of this patent is extended or adjusted under 35 U.S.C. 154(b) by 1049 days.

(21) Appl. No.: 12/065,724

(22) PCT Filed: Aug. 11, 2006

(86) PCT No.: PCT/KR2006/003161
§ 371 (c)(1),
(2), (4) Date: Mar. 4, 2008

(87) PCT Pub. No.: WO2007/029925
PCT Pub. Date: Mar. 15, 2007

(65) Prior Publication Data
US 2008/0216909 A1    Sep. 11, 2008

(30) Foreign Application Priority Data
Sep. 6, 2005   (KR) .................. 10-2005-0082784

(51) Int. Cl.
*F16K 11/20*   (2006.01)
*F16K 1/22*    (2006.01)
*F16K 3/08*    (2006.01)
*F16K 3/26*    (2006.01)
*F16K 41/04*   (2006.01)
*E03B 1/00*    (2006.01)

(52) U.S. Cl. ............... 137/637.3; 137/603; 137/607; 137/625.46; 137/861; 137/625.17; 137/454.6; 251/208; 251/286

(58) Field of Classification Search .......... 137/637.3, 137/637, 637.2, 603, 896, 897, 898, 605, 137/861, 862, 625.41, 637.5, 636.2, 607; 251/208, 287, 286
See application file for complete search history.

(56) References Cited

U.S. PATENT DOCUMENTS

| | | | | |
|---|---|---|---|---|
| 3,987,819 A * | 10/1976 | Scheuermann | ............ | 137/637.3 |
| 4,941,509 A * | 7/1990 | Orlandi | .................... | 137/625.17 |
| 5,107,884 A * | 4/1992 | Orlandi | ...................... | 137/454.5 |
| 5,329,958 A | 7/1994 | Bosio | | |
| 5,417,242 A * | 5/1995 | Goncze | .................... | 137/625.17 |
| 6,029,699 A * | 2/2000 | Granot | ......................... | 137/607 |
| 6,056,201 A * | 5/2000 | Ta | .............. | 236/12.12 |
| 6,202,695 B1 * | 3/2001 | Wu | ............................ | 137/625.3 |
| 6,357,476 B1 | 3/2002 | Moretti | | |
| 6,431,211 B1 * | 8/2002 | Wang | ....................... | 137/625.31 |
| 6,454,175 B1 * | 9/2002 | Lorch | .......................... | 236/12.2 |

(Continued)

FOREIGN PATENT DOCUMENTS

JP         06-221448         8/1994

(Continued)

*Primary Examiner* — Stephen M Hepperle
*Assistant Examiner* — Jonathan Waddy
(74) *Attorney, Agent, or Firm* — Park & Associates IP Law, P.C.

(57) ABSTRACT

A water supply valve cartridge in which a flow rate control rotary disk has a reduced size, so that surface friction between the flow rate control rotary disk and a flow rate control fixed disk is minimized, thus improving manipulation efficiency of the water supply valve while opening or closing the valve, and which does not sensitively respond to flatness allowance due to the reduced size of the rotary disk, thus executing stable opening and closing operation. The flow rate control fixed disk (140) has water discharge holes (142). The flow rate control rotary disk (150) has a diameter to cover only the area around the water discharge holes (142), with a pair of flow rate control grooves (151) formed on the rotary disk (150) to open only the water discharge holes (142) during rotation.

10 Claims, 9 Drawing Sheets

U.S. PATENT DOCUMENTS

| | | | |
|---|---|---|---|
| 6,517,006 B1 * | 2/2003 | Knapp | 236/12.2 |
| 7,143,786 B2 * | 12/2006 | Romero | 137/606 |
| 7,195,225 B1 * | 3/2007 | Holliday | 251/63.5 |
| 7,607,639 B2 * | 10/2009 | Chen et al. | 251/208 |
| 7,841,362 B2 * | 11/2010 | Kim | 137/637 |

FOREIGN PATENT DOCUMENTS

| | | | |
|---|---|---|---|
| JP | 11081404 A | | 3/1999 |
| KR | 10-2004-0020750 | | 3/2004 |
| KR | 20050018770 | * | 2/2005 |

* cited by examiner

WATER SUPPLY VALVE CARTRIDGE

TECHNICAL FIELD

The present invention relates, in general, to water supply valve cartridges and, more particularly, to a water supply valve cartridge that controls the temperature and flow rate of hot water and cold water, which are supplied from respective outside sources, prior to discharging the water.

BACKGROUND ART

Generally, a water supply valve, which is configured to control the temperature and flow rate of water when supplying water, means a water control valve that controls the flow rate of water supplied from an outside water source (including hot water supplied from a boiler) and controls the temperature of water by selecting cold water or hot water, or by mixing cold water and hot water.

The water supply valve capable of controlling the temperature and flow rate of water may be installed in a kitchen, at an appropriate position above a sink, or in a bathroom (including a public bath), at a predetermined position so that a user can easily use water by manipulating the valve as desired.

Conventional water supply valves to control the temperature and flow rate of water when supplying water have been classified into knob-operated valves, which can control the flow rate and temperature of water by manipulating rotary knobs to select cold water or hot water or to mix the cold water and hot water, and lever-operated valves, which can control the flow rate of water by moving a lever upwards or downwards and control the temperature of water by rotating the lever leftwards or rightwards to select cold water, hot water, or a mix of the cold water and hot water.

Described in detail, in conventional knob-operated water supply valves, a cold water knob, which is manipulated to discharge cold water at a controlled flow rate, and a hot water knob, which is manipulated to discharge hot water at a controlled flow rate, are provided on opposite sides of a valve body. Thus, when it is desired to use cold water or hot water exclusively, a user can easily control the flow rate of water by manipulating a knob designated for cold water or hot water. However, when it is desired to use mixed water of a desired temperature (between the temperature of hot water and the temperature of cold water), the two knobs (for cold water and hot water) must be carefully manipulated to provide the desired temperature so that the knobs trouble users while manipulating the knobs and the knob-operated valves are inconvenient to the users.

Particularly, the conventional knob-operated valves each have a plurality of valve cartridges used for separately controlling the flow rates of cold water and hot water. Thus, the valve cartridges of each of the conventional knob-operated valves comprise many elements, complicating the construction of the water supply valves.

Furthermore, the plurality of valve cartridges having many elements causes the conventional knob-operated valves to have a complex and crude appearance. Thus, the conventional knob-operated valves do not appeal to the taste of modern people preferring a simple and refined appearance and, furthermore, increase production costs thereof.

The conventional lever-operated water supply valves are problematic in that they needlessly waste an excessive amount of water because the lever-operated valves cannot precisely control the flow rate of water, unlike the knob-operated valves. Furthermore, the conventional lever-operated valves become worn at frictional contact surfaces thereof by use over a lengthy period, causing leakage of water from the junctions of the worn contact surfaces.

Particularly, most conventional lever-operated valves have one lever (because they are designed as single lever-type valves), thus causing a manipulation problem in which the valves may change the existing flow rate of water during temperature control operation and change the existing temperature of water during flow rate control operation.

Described in detail, because the conventional lever-operated water supply valve has a single lever to control the temperature and flow rate of water, a user must control the temperature and flow rate of water by manipulating the single lever as follows. To control the temperature of water, the user manipulates the single lever so that a control disk of the valve is rotated leftwards or rightwards, thereby adjusting the opening ratios of hot and cold water inlet holes and controlling the mixing ratio of hot and cold water, and controlling the temperature of water to be discharged from the valve. To control the flow rate of water, the user manipulates the single lever to move the control disk forwards or backwards, thus adjusting the opening ratio of a water discharge hole and controlling the flow rate of water to be discharged from the valve. Thus, the conventional lever-operated valves having single valves cause the above-mentioned manipulation problem.

Furthermore, in operation of the above-mentioned lever-operated valves, the lever cannot be precisely manipulated, so that excessive time is required to control the temperature of water to a desired point during which an excessive amount of water is discharged from the valve and is needlessly wasted. In addition, users may unintentionally fully open the lever-operated valves, thereby wasting an excessive amount of water.

In an effort to overcome the above-mentioned problems, the present inventor proposed a water supply valve in Korean Patent Application No. 10-2004-0099326, filed on Nov. 30, 2004.

Figure 1:
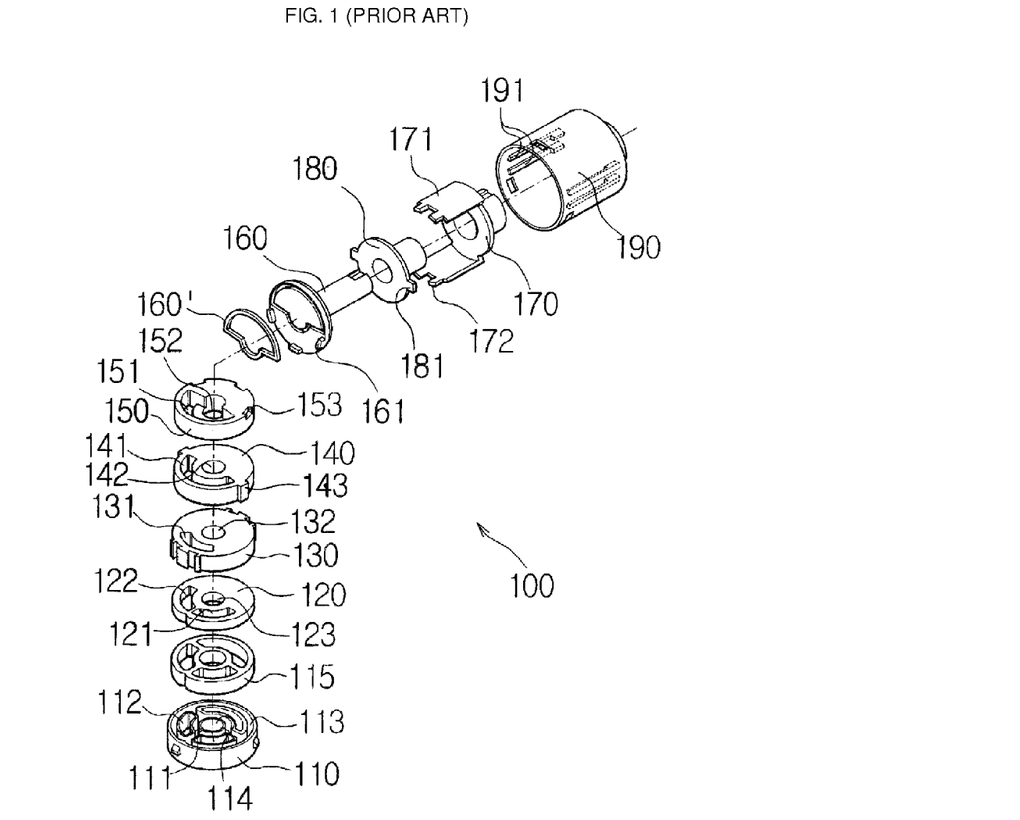
FIG. 1 is an exploded perspective view illustrating a water supply valve cartridge; (Proposed by the inventor by Korean Patent Application No 10-2004-0099326)
Figure 2:
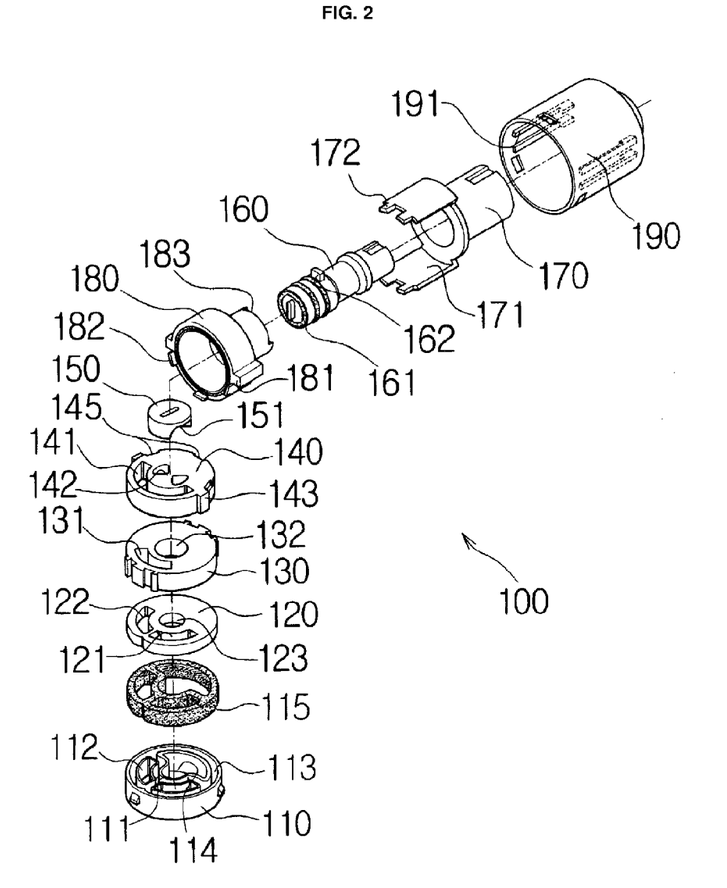
FIG. 2 is an exploded perspective view illustrating the construction of a first embodiment of the present invention.
Figure 3:
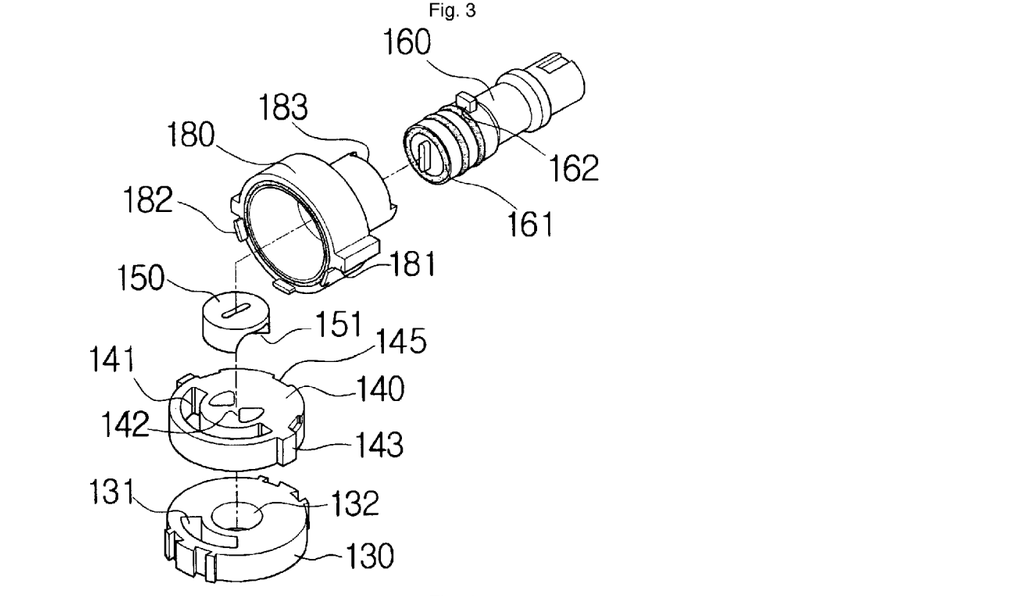
FIG. 3 is an exploded perspective view illustrating the construction of an important part of the first embodiment of the present invention.

As shown in FIG. 1, the water supply valve proposed by the present inventor, which is configured to control the temperature of water by appropriately mixing hot water and cold water and control the flow rate of the hot water, cold water or a mix of the hot and cold water, includes a valve cartridge 100. The valve cartridge 100 includes: a first fixed disk 120 to separately guide hot water and cold water flowing from the outside into the valve cartridge; a first rotary disk 130 to rotate in relation to the first fixed disk 120 and control the temperature of water according to the amount of mixed water of cold water and hot water; a second fixed disk 140 to guide hot water and cold water flowing from the first rotary disk 130 into the valve cartridge through a water inlet path; and a second rotary disk 150 to control the amount of discharged water of hot water and cold water flowing from the second fixed disk 140. The valve cartridge 100 is installed in a valve body 200, with the first rotary disk 130 placed in the cartridge to be rotated by a temperature control unit 170. Furthermore, the second rotary disk 150 is concentrically rotated relative to the temperature control unit 170 by a flow rate control unit 160. The above-mentioned disks 120, 130, 140 and 150 have respective water discharge holes at positions aligned with each other, thus defining a water discharge path.

However, the above-mentioned water supply valve having the improved structure is problematic in that the diameter of the second rotary disk, which is in surface contact with and rotates relative to the second fixed disk so as to open or close the water inlet path and the water discharge path, is equal to that of the second fixed disk, so that the two disks have a large contact surface area, increasing friction between them.

Due to the above-mentioned problem, the second rotary disk is not easy to manipulate, thus reducing manipulation efficiency. Furthermore, due to the large contact surface area, managing flatness allowance of the disks is not easy.

DISCLOSURE OF INVENTION

Technical Problem

Accordingly, the present invention has been made keeping in mind the above problems occurring in the prior art, and an object of the present invention is to provide a water supply valve cartridge in which a rotary disk to control the flow rate of water has a reduced size, so that surface friction between the rotary disk and a corresponding fixed disk is minimized, and which does not sensitively respond to flatness allowance (caused by surface contact between the rotary disk and the fixed disk) due to the reduced size of the rotary disk.

Technical Solution

The present invention provides a water supply valve cartridge, including: a plurality of rotary disks that are rotated by operation of a temperature control unit and a flow rate control unit, thus opening or closing hot and cold water inlet holes and a water passage hole formed in a plurality of corresponding fixed disks and a plurality of water discharge holes, wherein the flow rate control fixed disk among the fixed disks of the valve cartridge, which has the water passage hole to introduce inlet cold water, inlet hot water or a mix of the cold and hot water, is provided with a pair of water discharge holes, which are symmetrically formed through a center of the flow rate control fixed disk at a position spaced apart from the water passage hole by a predetermined gap, are opened or closed by the flow rate control rotary disk and controllably discharge the cold water, the hot water or the mix of the cold and hot water, and the flow rate control rotary disk among the rotary disks, which controls the amount of inlet cold water and inlet hot water and discharges the water by operation of the flow rate control unit, has a diameter to cover only the area around the water discharge holes of the flow rate control fixed disk, with a pair of flow rate control grooves formed on both sides of an end surface of the flow rate control rotary disk to open only the water discharge holes during rotation of the flow rate control rotary disk.

Advantageous Effects

The present invention reduces the size of the rotary disk to control the flow rate of water in a water supply valve, thus minimizing friction between the rotary disk and the fixed disk and improving manipulation efficiency while opening or closing the water supply valve, and allows the valve cartridge to be free from sensitively responding to flatness allowance due to the reduced size of the rotary disk, so that the water supply valve can execute stable opening and closing operation.

DESCRIPTION OF THE ELEMENTS IN THE DRAWINGS

100: valve cartridge 110: cartridge base block
120: first fixed disk 121,122 : hot and cold water inlet holes
123,132,142,152: water discharge holes
130: first rotary disk 131: temperature control hole
140: second fixed disk 141: water passage hole
143: locking protrusion 144: water passage hole
145: loking recession 150: second rotary disk
151: flow rate control groove 152: flow rate control hole
153: annular seat 160: flow rate control unit
161: elastic 162: stopper
164: water discharge passage 165: boss
170: temperature control unit 171: extension arms
172: locking protrusions 180: stop bushing
181: first locking protrusion
182: second locking protrusion
183: guide groove 190: cartridge housing
191: stop protrusion

BEST MODE FOR CARRYING OUT THE INVENTION

As shown in FIGS. 2 to 4 and 5, the present invention provides a water supply valve cartridge 100, which includes two rotary disks 130 and 150 that are rotated by operation of a temperature control unit 170 and a flow rate control unit 160, thus opening or closing hot and cold water inlet holes 121 and 122 and a water passage hole 141 formed in corresponding fixed disks 120 and 140 and a plurality of water discharge holes 123, 132, and 142. In the water supply valve cartridge 100, the flow rate control fixed disk 140 among the two fixed disks 120 and 140, which has the water passage hole 141 to introduce inlet cold water, inlet hot water or a mix of the cold and hot water, is provided with two water discharge holes 142. The two water discharge holes 142 are symmetrically formed through the center of the flow rate control fixed disk 140 at a position spaced apart from the water passage hole 141 by a predetermined gap, are opened or closed by the flow rate control rotary disk 150, and controllably discharge the cold water, the hot water or the mix of the cold and hot water. The flow rate control rotary disk 150 among the two rotary disks 130 and 150, which controls the amount of inlet cold water and inlet hot water and discharges the water by operation of the flow rate control unit 160, has a diameter to cover only the area around the water discharge holes 142 of the flow rate control fixed disk 140. Two flow rate control grooves 151 are formed on both sides of an end surface of the flow rate control rotary disk 150 to open only the two water discharge holes 142 during rotation of the flow rate control rotary disk 150 relative to the fixed disk 140.

Compared with the prior invention proposed by the inventor (Korean Patent Application No 10-2004-0099326), the present invention is advantageous in that, due to the flow rate control rotary disk having the reduced diameter, the friction between the flow rate control rotary disk and the flow rate control fixed disk is reduced, thus allowing a user to easily manipulate the water supply valve.

Particularly, the two flow rate control grooves, which are formed on the flow rate control rotary disk, occupy about ½ of the entire surface area of the flow rate control rotary disk so that the surface area of the rotary disk, which is in surface contact with the flow rate control fixed disk, is further reduced. Thus, the friction between the rotary disk and the fixed disk is further reduced and allows a user to further easily manipulate the valve while controlling the flow rate of water.

Among the above-mentioned elements of the valve cartridge 100 according to the present invention, the two fixed disks include a first fixed disk 120 as a temperature control fixed disk and a second fixed disk 140 as a flow rate control fixed disk.

In the water supply valve cartridge, the first fixed disk 120 separately introduces the inlet cold water and inlet hot water into the valve cartridge. This first fixed disk 120 is partially inserted into a cartridge base block 110, through which water is introduced into and discharged from the valve cartridge. The hot and cold water inlet holes 121 and 122 are formed through the first fixed disk at predetermined positions to separately introduce the inlet cold water and inlet hot water into the valve cartridge through the cartridge base block 110. The water discharge hole 123 is formed through the center of the first fixed disk.

Furthermore, the second fixed disk 140 introduces a mix of the cold and hot water into the valve cartridge through a single passage, after mixing the inlet cold water with the inlet hot water. This second fixed disk 140 is placed to overlap the first rotary disk 130. The water passage hole 141 is formed through the second fixed disk at a predetermined position within a rotational angular range of a temperature control hole 131 of the first rotary disk 130. The two water discharge holes 142 are formed through the second fixed disk at a position aligned with the water discharge hole 132 of the first rotary disk 130.

The second fixed disk 140 has two locking protrusions 143 on an outer circumferential surface thereof to engage with locking protrusions of a stop bushing, as will be described later herein.

Among the above-mentioned elements of the valve cartridge 100 according to the present invention, the two rotary disks include a first rotary disk 130 as a temperature control rotary disk and a second rotary disk 150 as a flow rate control rotary disk.

The first rotary disk 130 rotates relative to the first fixed disk 120 and controls the temperature of water according to the amount of cold water and hot water to be mixed together. This first rotary disk 130 is in surface contact with the first fixed disk 120 and has a temperature control hole 131 to control the opening ratios of the hot and cold water inlet holes 121 and 122 of the first fixed disk 120 during rotation of the first rotary disk. A water discharge hole 132 is formed through the first rotary disk at a position aligned with the water discharge hole 123 of the first fixed disk 120.

Furthermore, the second rotary disk 150 controls the amount of outlet cold water and outlet hot water flowing from the second fixed disk 140. This second rotary disk 150 is in surface contact with the second fixed disk 140 and has flow rate control grooves 151, which are formed on the second rotary disk to control the opening ratio of the water discharge holes 142 of the second fixed disk 140 during rotation of the second rotary disk, caused by operation of the flow rate control unit 160.

In the present invention, the flow rate control grooves 151 may have a triangular shape or a fan shape formed around the center of the rotary disk.

Among the above-mentioned elements of the valve cartridge 100 according to the present invention, the flow rate control unit 160 is coupled through fitting at a first end thereof to an end surface of the second rotary disk 150 opposed to the end having the flow rate control grooves 151. An elastic 161 is provided on the end surface of the flow rate control unit 160 to bring the second rotary disk 150 into close contact with the second fixed disk 140. A stopper 162 is formed on an intermediate portion of the outer circumferential surface of the flow rate control unit 160 to rotate within 90 degrees relative to a guide groove 183 formed on an end of a stop bushing 180 through cutting.

Furthermore, among the above-mentioned elements of the valve cartridge 100 according to the present invention, the temperature control unit 170 is concentrically fitted over the flow rate control unit 160, with the stop bushing 180 being fitted into a cartridge housing 190 and separating the temperature control unit 170 from the flow rate control unit 160, and the first rotary disk 130 being fitted into the temperature control unit 170.

Furthermore, among the above-mentioned elements of the valve cartridge 100 according to the present invention, the stop bushing 180 includes first locking protrusions 181, which are formed on the outer circumferential surface of the stop bushing 180 to engage with stop protrusions 191 formed on the inner circumferential surface of the cartridge housing 190, thus being prevented from rotating relative to the cartridge housing 190. Second locking protrusions 182 are formed on the first end to engage with the locking recession 145 of the second fixed disk 140. The guide groove 183 is formed on a second end of the stop bushing 180 opposed to the locking protrusions 181 and 182, and guides the stopper 162 of the flow rate control unit 160.

Furthermore, among the above-mentioned elements of the valve cartridge 100 according to the present invention, the cartridge housing 190 receives therein the above-mentioned elements. The two pairs of stop protrusions 191, formed on the inner circumferential surface of the cartridge housing 190 at diametrically opposed positions, fix both the second fixed disk 140 and the stop bushing 180 and limit the rotating angular range of the first rotary disk 130.

Furthermore, the cartridge base block 110 has hot and cold water supply holes 111 and 112, which are connected to respective external water supply pipes. In the present invention, the first fixed disk 120 is partially inserted into a gasket insert groove 113 of the cartridge base block 110, into which a gasket 115 is inserted, so that the first fixed disk does not undesirably move in the valve cartridge.

Figure 4:
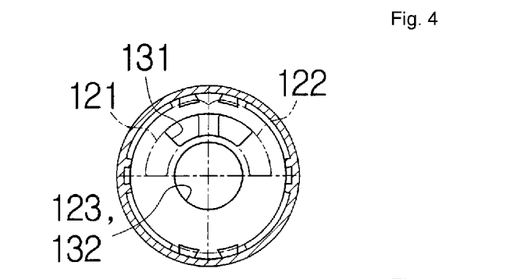
FIGS. 4, 5 and 6 are plan views illustrating the temperature control operation of the first embodiment of the present invention.
Figure 5:
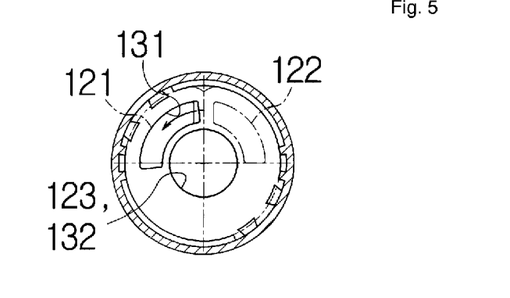
Figure 6:
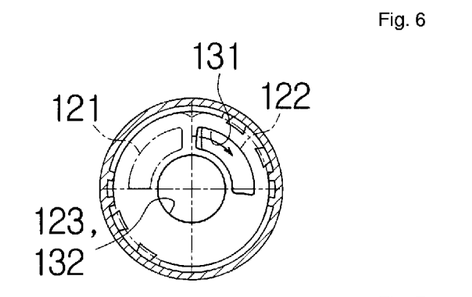

As shown in FIGS. 4, 5 and 6, during operation of the valve cartridge according to the present invention, the amount of inlet cold water and inlet hot water is controlled according to the opening ratios (ratios of opened parts relative to the entire cross section) of the hot and cold water inlet holes 121 and 122 of the first fixed disk 120, which are controlled by the temperature control hole 131 of the first rotary disk 130.

In the above state, because the extension arms 171 of the temperature control unit 170 are restricted by the stop protrusions 191, which are formed on the inner circumferential surface of the cartridge housing 190, the rotating angular degree of the first rotary disk 130 is limited to a predetermined angular range.

Figure 7:
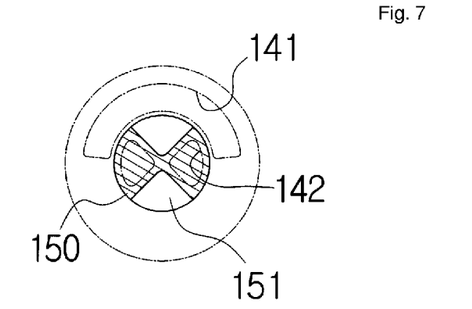
FIGS. 7 and 8 are plan views illustrating the flow rate control operation of the first embodiment of the present invention.
Figure 8:
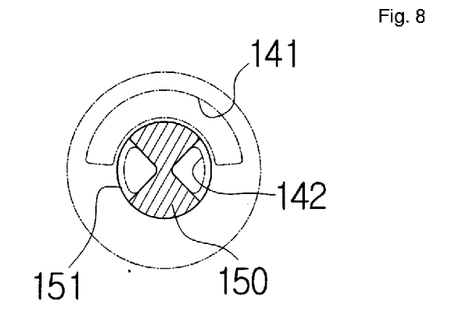

Furthermore, as shown in FIGS. 7 and 8, the present invention is configured such that the surface of the second rotary disk 150, which is in surface contact with the second fixed disk 140, is coupled to an end of the flow rate control unit 160 through fitting. Thus, the rotating motion of the flow rate control unit 160 is transmitted to the second rotary disk 150 and rotates the second rotary disk 150. In the above state, the amount of water to be discharged from the valve is controlled by the opening ratio (ratios of opened parts relative to the entire cross section) of the water discharge holes 142 of the second fixed disk 140, which is controlled by the flow rate control groove 151 of the second rotary disk 150.

In the above state, the second rotary disk 150 is a disk having a diameter to open or close only the water discharge holes 142 of the second fixed disk 140 so that the surface area, on which the two disks 140 and 150 are in frictional contact with each other, is reduced and allows an easy manipulation for the valve.

Figure 9:
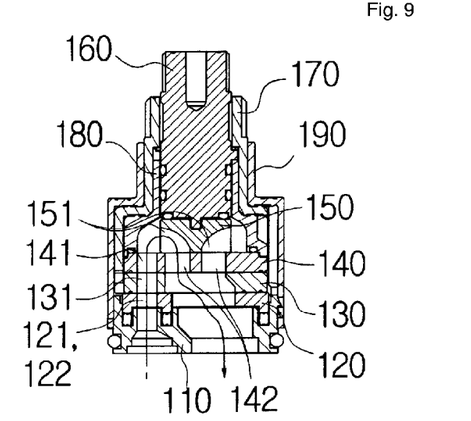
FIGS. 9 and 10 are sectional views illustrating the opened and closed state of the first embodiment of the present invention.

As shown in FIG. 9, when hot water and cold water, which flowed into the valve cartridge through the hot and cold water supply holes 111 and 112 of the cartridge base block 110, have separately reached the hot and cold water inlet holes 121 and 122 of the fixed disk 120, the hot water, cold water or a mix of the hot and cold water flows into the valve cartridge according to an angular position of the temperature control hole 131 of the first rotary disk 130 (see FIG. 4). In the above state, the inlet water passes through the water passage hole 141 of the second fixed disk 140. Thereafter, the water is discharged from the valve through the plurality of water discharge holes of the respective disks and through a water outlet hole 114 of the cartridge base block 110. In the above state, the amount of water to be discharged from the valve is controlled by the opening ratio of the water discharge holes 142, which is controlled by the flow rate control grooves 151 of the second rotary disk 150 (see FIG. 8).

Figure 10:
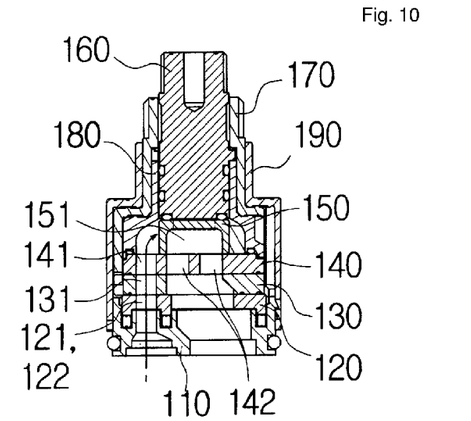

However, as shown in FIG. 10, although inlet water has flowed into the valve cartridge through the water passage hole 141 of the second fixed disk 140, if the water discharge holes 142 of the second fixed disk 140 do not communicate with the flow rate control grooves 151 of the second rotary disk 150, the water cannot further flow into the valve cartridge, so that the valve cartridge cannot discharge water.

The above-mentioned closed state of the valve cartridge is illustrated in FIG. 7.

Figure 11:
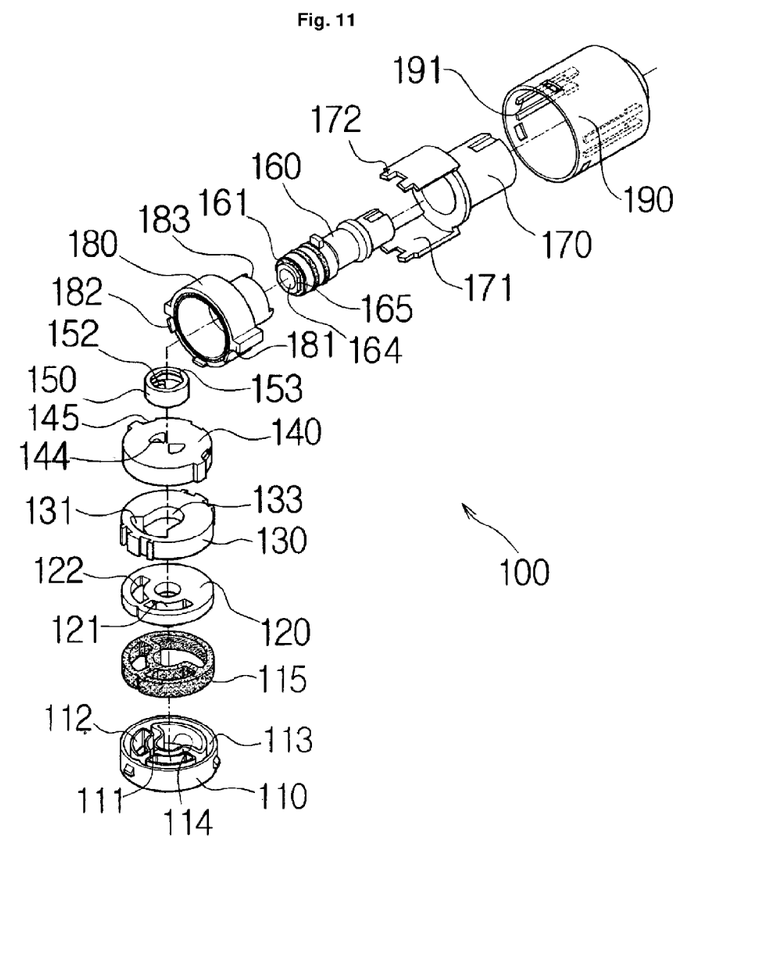
FIG. 11 is an exploded perspective view illustrating the construction of a second embodiment of the present invention.
Figure 12:
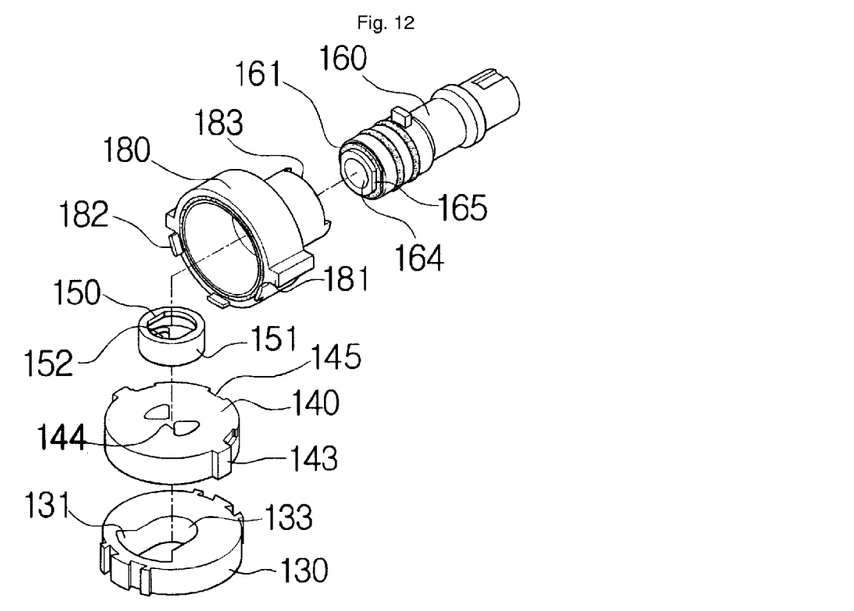
FIG. 12 is an exploded perspective view illustrating the construction of an important part of the second embodiment of the present invention.

Herein below, a further embodiment of the present invention will be described. As shown in FIGS. 11 and 12, the first rotary disk 130 may be provided with a guide hole 133 to cause the temperature control hole 131 of the first rotary disk 130 to communicate with the water discharge hole 132.

Figure 13:
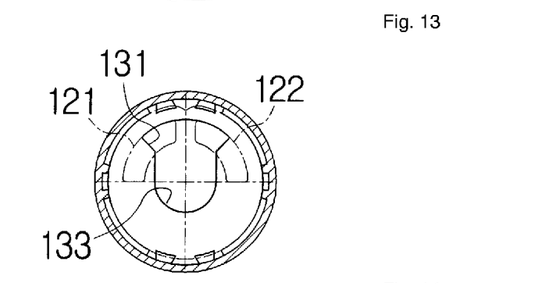
FIGS. 13, 14 and 15 are plan views illustrating the temperature control operation of the second embodiment of the present invention.
Figure 14:
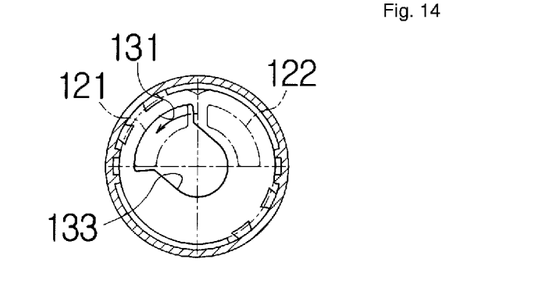
Figure 15:
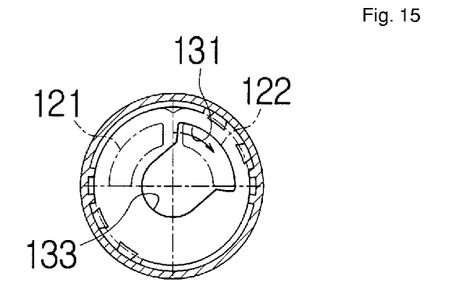

Furthermore, as shown in FIGS. 13, 14 and 15, if the first rotary disk 130 is rotated by a rotating motion of the temperature control unit 170, the temperature control hole 131 of the first rotary disk 130 controls the opening ratios of the hot and cold water inlet holes 121 and 122 of the first fixed disk 120, thus discharging cold water, hot water or a mix of the hot and cold water from the valve.

Furthermore, a pair of symmetric water passage holes 144 may be formed through the center of the second fixed disk 140 such that the water passage holes 144 communicate with the guide hole 133 of the first rotary disk 130.

In the above case, water may be guided to the center of the valve cartridge after passing through the first rotary disk 130.

Furthermore, the second rotary disk 150 may be provided on a surface thereof, which is in surface contact with the second fixed disk 140, with flow rate control holes 152 corresponding to the water passage holes 144 of the second fixed disk 140. In the above case, an annular seat 153 having a longer axis and a shorter axis may be formed on an end of the second rotary disk 150 to receive therein an end of the flow rate control unit 160.

Figure 16:
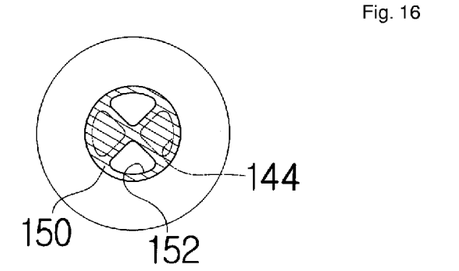
FIGS. 16 and 17 are plan views illustrating the flow rate control operation of the second embodiment of the present invention.
Figure 17:
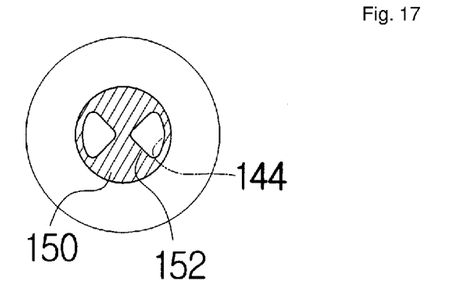

Thus, the second rotary disk 150 can be rotated by a rotating motion of the flow rate control unit 160 and, as shown in FIGS. 16 and 17, opens or closes the water passage holes 144 of the second fixed disk 140. In the above case, the flow rate of water to be discharged can be controlled by the opening ratio of the water passage holes 144.

Furthermore, a water discharge passage 164 may be formed through the central axis of the flow rate control unit 160, with a boss 165 formed on the flow rate control unit 160 to be inserted in the annular seat 153 of the second rotary disk 150.

Figure 18:
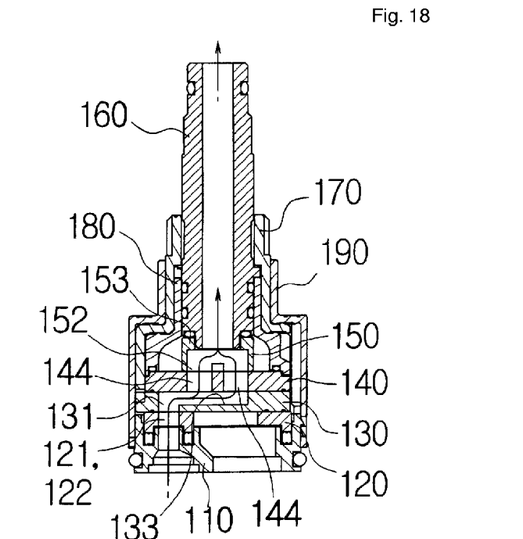
FIGS. 18 and 19 are sectional views illustrating the opened and closed state of the second embodiment of the present invention.

In the above case, if the water passage holes 144 of the second fixed disk 140 are opened by or aligned with the flow rate control holes 152 of the second rotary disk 150 by a rotating motion of the flow rate control unit 160, inlet water, which passed through the second rotary disk 150, can be discharged from the valve through the water discharge passage 164 of the flow rate control unit 160, as shown in FIG. 18.

In other words, water, which has flowed into the valve cartridge 100, can be discharged from the valve cartridge to the outside of the valve.

Figure 19:
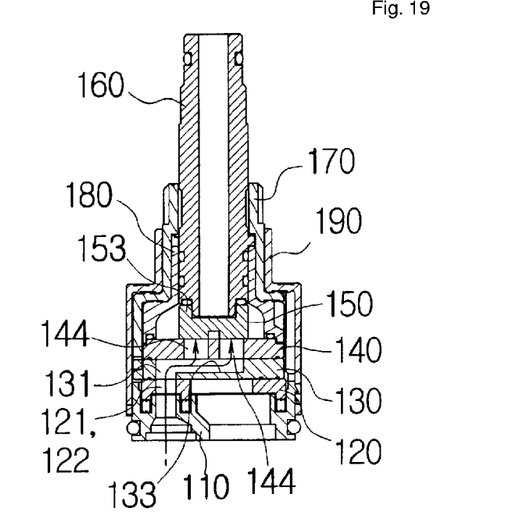

However, if the flow rate control holes 152 of the second rotary disk 150, which are rotated by a rotating motion of the flow rate control unit 160, do not communicate with the water passage holes 144 of the second fixed disk 140, the disk surface, except for the flow rate control holes 152 of the second rotary disk 150, is closed so that the water which has reached the water passage holes 144 of the second fixed disk 140 is prevented from being discharged to the outside through the water discharge passage 164 of the flow rate control unit 160, as shown in FIG. 19.

Meanwhile, in the case that a through hole (not shown) is formed at a predetermined position through the second fixed disk 140, water, which has passed upwards through the through hole of the second fixed disk 140, applies pressure downwards, so that contact force between an upper surface of the second fixed disk 140 and a lower surface of the second rotary disk 150 is increased. Therefore, even if high hydraulic pressure is applied to the valve cartridge, that is, even if hydraulic pressure increases above the limit, the disk can be smoothly operated.

Industrial Applicability

The present invention provides a water supply valve cartridge in which a rotary disk to control the flow rate of water has a reduced size, so that surface friction between the rotary disk and a corresponding fixed disk is minimized, thus improving manipulation efficiency of a water supply valve while opening or closing the valve, and which does not sensitively respond to flatness allowance due to the reduced size of the rotary disk, thus executing stable opening and closing operation.

The invention claimed is:

1. A water supply valve cartridge, comprising: first and second rotary disks (130 and 150) that are rotated by operation of a temperature control unit (170) and a flow rate control unit (160), thus opening or closing hot and cold water inlet holes (121 and 122) formed in a first fixed disk (120) and a water passage hole (141) formed in a second fixed disk (140) and a plurality of water discharge holes comprising a water discharge hole (123) formed through the first fixed disk (120), a water discharge hole (132) of the first rotary disk (130), and a pair of water discharge holes (142) formed in the second fixed disk (140), wherein the second fixed disk (140) among the fixed disks (120 and 140) of the valve cartridge (100), which has the water passage hole (141) to introduce inlet cold water, inlet hot water or a mix of the cold and hot water, is provided with the pair of water discharge holes (142), which are symmetrically formed through a center of the second fixed disk at a position spaced apart from the water passage hole (141) by a predetermined gap, are opened or closed by the second rotary disk (150) and controllably discharge the cold water, the hot water or the mix of the cold and hot water, and the second rotary disk (150) among the rotary disks (130 and 150), which controls the amount of inlet cold water and inlet hot water and discharges the water by operation of the flow rate control unit (160), has a diameter to cover only the area around the water discharge holes (142) of the second fixed disk (140), with a pair of flow rate control grooves (151) formed on both sides of an end surface of the second rotary disk (150) to open only the water discharge holes (142) during rotation of the second rotary disk (150).

2. The water supply valve cartridge according to claim 1, wherein the first fixed disk (120) is a temperature control fixed disk and the second fixed disk (140) is a flow rate control fixed disk.

3. The water supply valve cartridge according to claim 1, wherein the first fixed disk (120), which separately introduces the inlet cold water and inlet hot water into the valve cartridge, is partially inserted into a cartridge base block (110), through which water is introduced into and discharged from the valve cartridge, with the hot and cold water inlet holes (121 and 122) formed through the first fixed disk at predetermined positions to separately introduce the inlet cold water and inlet hot water into the valve cartridge through the cartridge base block (110), and the water discharge hole (123) formed through a center of the first fixed disk (120).

4. The water supply valve cartridge according to claim 1, wherein the second fixed disk (140), which introduces the mix of the cold and hot water into the valve cartridge through the water passage hole after mixing the inlet cold water with the inlet hot water, is placed to overlap the first rotary disk (130), with the water passage hole (141) formed through the second fixed disk at a predetermined position within a rotational angular range of a temperature control hole (131) of the first rotary disk (130), and the pair of water discharge holes (142) formed through the second fixed disk at a position aligned with the water discharge hole (132) of the first rotary disk(130).

5. The water supply valve cartridge according to claim 1, wherein the first rotary disk (130) is a temperature control rotary disk, and the second rotary disk (150) is a flow rate control rotary disk.

6. The water supply valve cartridge according to claim 1, wherein the first rotary disk (130), which rotates relative to the first fixed disk (120) and controls the temperature of water according to the amount of cold water and hot water to be mixed together, is in surface contact with the first fixed disk (120) and has a temperature control hole (131) to control the opening ratio of the hot and cold water inlet holes (121 and 122) of the first fixed disk (120) during rotation of the first rotary disk, with the water discharge hole (132) formed through the first rotary disk at a position aligned with the water discharge hole (123) of the first fixed disk (120).

7. The water supply valve cartridge according to claim 1, wherein the second rotary disk (150), which controls the amount of outlet cold water and outlet hot water flowing from the second fixed disk (140), is in surface contact with the second fixed disk (140), with the flow rate control grooves (151) formed on the second rotary disk to control the opening ratio of the water discharge holes (142) of the second fixed disk (140) during rotation of the second rotary disk caused by operation of the flow rate control unit (160).

8. The water supply valve cartridge according to claim 1, wherein the flow rate control unit (160) is coupled through a fitting at a first end thereof to an end surface of the second rotary disk (150) opposed to the end surface having the flow rate control grooves (151), with an elastic (161) provided on the first end to bring the second rotary disk (150) into close contact with the second fixed disk (140), and a stopper (162) formed on an intermediate portion of an outer circumferential surface of the flow rate control unit (160) to rotate within 90 degrees relative to a guide groove (183) formed on an end of a stop bushing (180) through cutting.

9. The water supply valve cartridge according to claim 1, wherein the temperature control unit (170) is concentrically fitted over the flow rate control unit (160), with a stop bushing (180) being fitted into a cartridge housing (190) and separating the temperature control unit (170) from the flow rate control unit (160), and the first rotary disk (130) being fitted into the temperature control unit (170).

10. The water supply valve cartridge according to claim 1, further comprising a stop bushing (180), wherein the stop bushing (180) comprises: a first locking protrusion (181) formed on an outer circumferential surface of the stop bushing to engage with a stop protrusion (191) formed on an inner circumferential surface of a cartridge housing (190), thus being prevented from rotating relative to the cartridge housing (190); a second locking protrusion (182) formed on an engaging a first locking recession (145) of the second fixed disk (140); and a guide groove (183) formed on a second end of the stop brushing (180) opposed to the locking protrusions (181 and 182) and guiding a stopper (162) of the flow rate control unit (160).

* * * * *